United States Patent
Tinio et al.

(10) Patent No.: US 11,508,019 B2
(45) Date of Patent: Nov. 22, 2022

(54) REGULATING CHARGING AND DISCHARGING OF AN ENERGY STORAGE DEVICE AS PART OF AN ELECTRICAL POWER DISTRIBUTION NETWORK

(71) Applicant: Inventus Holdings, LLC, Juno Beach, FL (US)

(72) Inventors: Marc Benedict C. Tinio, Juno Beach, FL (US); Maikel Martin, Juno Beach, FL (US); Hector K. Lopez, Juno Beach, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 194 days.

(21) Appl. No.: 16/420,739

(22) Filed: Jun. 4, 2019

(65) Prior Publication Data
US 2020/0387981 A1    Dec. 10, 2020

(51) Int. Cl.
*G06Q 50/06* (2012.01)
*H02J 7/00* (2006.01)
(Continued)

(52) U.S. Cl.
CPC ........... *G06Q 50/06* (2013.01); *G05B 13/048* (2013.01); *G06Q 30/0206* (2013.01); *H02J 7/0068* (2013.01); *H02J 7/042* (2013.01)

(58) Field of Classification Search
CPC ... G06Q 50/06; G06Q 30/0206; H02J 7/0068; H02J 7/042; H02J 2300/40;
(Continued)

(56) References Cited

U.S. PATENT DOCUMENTS

| 6,900,556 B2 | 5/2005 | Provanzana et al. |
| 7,590,472 B2 | 9/2009 | Hakim et al. |

(Continued)

FOREIGN PATENT DOCUMENTS

| JP | 2018093652 | 6/2018 |
| WO | 2013000474 | 3/2013 |

(Continued)

OTHER PUBLICATIONS

Mohsenian-Rad, Optimal residential load control with price prediction in real-time electricity pricing environments, IEEE Trans. Smart Grid 1.2 (2010): 120-133.

(Continued)

*Primary Examiner* — Tejal Gami
(74) *Attorney, Agent, or Firm* — Fleet Intellectual Property Law; Jon Gibbons

(57) ABSTRACT

A system and a method for regulating charging and discharging of an energy storage device as part of an electrical power distribution network is described. The invention is a smart control algorithm for a bi-directional switch in which an energy storage device, such as a battery set, is charged when electricity prices are low and discharged when electricity prices are high. The invention uses two different types of pricing data: forecasted price data and real-time price data. The forecasted price data is used to set a threshold. When the real-time price data of electricity exceeds this threshold, the energy storage device is set to discharge and send power to the grid. Otherwise the energy storage device is set to charge. The threshold is set periodically, typically in 30 minute to several hour intervals to capture the latest data.

6 Claims, 6 Drawing Sheets

(51) Int. Cl.
*G06Q 30/02* (2012.01)
*G05B 13/04* (2006.01)
*H02J 7/04* (2006.01)

(58) Field of Classification Search
CPC .... H02J 2300/24; H02J 2203/20; H02J 3/008; H02J 3/381; H02J 3/32; H02J 2300/28; G05B 13/048; Y04S 50/14
See application file for complete search history.

(56) References Cited

U.S. PATENT DOCUMENTS

| | | | |
|---|---|---|---|
| 7,957,846 | B2 | 6/2011 | Hakim et al. |
| 8,831,786 | B2 | 9/2014 | Son et al. |
| 9,098,817 | B2 | 8/2015 | Asghari et al. |
| 9,153,963 | B2 | 10/2015 | Baba et al. |
| 9,159,108 | B2 | 10/2015 | Steven et al. |
| 9,209,625 | B2 | 12/2015 | Tyagi et al. |
| 9,257,846 | B2 | 2/2016 | Darcy |
| 9,293,915 | B2 | 3/2016 | Baba et al. |
| 9,568,901 | B2 | 2/2017 | Hooshmand et al. |
| 9,979,198 | B2 | 5/2018 | Darden et al. |
| 2010/0138363 | A1 | 6/2010 | Batterberry et al. |
| 2012/0229081 | A1 | 9/2012 | Kiuchi et al. |
| 2015/0112751 | A1* | 4/2015 | Spooren .......... G06Q 10/06315 705/7.25 |
| 2016/0141873 | A1 | 5/2016 | Ellice-flint et al. |
| 2017/0345107 | A1 | 11/2017 | Hirata et al. |
| 2018/0018850 | A1 | 1/2018 | Sato et al. |

FOREIGN PATENT DOCUMENTS

| | | |
|---|---|---|
| WO | 2013132292 | 9/2013 |
| WO | 2017171636 | 10/2017 |
| WO | 2018074651 | 4/2018 |

OTHER PUBLICATIONS

Ranaweera, et al., Optimization of operational cost for a grid-supporting PV system with battery storage, Renewable Energy 88 (2016): 262-272.

\* cited by examiner

REGULATING CHARGING AND DISCHARGING OF AN ENERGY STORAGE DEVICE AS PART OF AN ELECTRICAL POWER DISTRIBUTION NETWORK

FIELD OF THE DISCLOSURE

The present disclosure generally relates to electrical power distribution, and more specifically to the regulating charging and discharging of an energy storage device as part of an electrical power distribution network.

BACKGROUND

Wind, solar energy and other renewable resources are an attractive alternative to fossil fuels used in power generation due to clean operating characteristics. However, unlike coal-fired or gas-fired power station, it is difficult to predict the amount of energy generated at any one time from renewable energy generation sites.

Stored energy electric generation systems, such as Battery Energy Storage Systems (BESS), provide advantages to the operation of the electric power grid. For example, such stored energy electric generation systems, or BESS, are able to provide for frequency response in order to control frequency shifts due to mismatches between electric power generation and demand. Additionally, such stored energy electric generation systems, or BESS, are able to provide load shifting as is known to those familiar with the art. In general, stored energy electric generation systems are dispatched to produce power in order to meet objectives or requirements of operating and regulating the quality of power on the grid, such as frequency regulation or other criterion known to those familiar with the art.

The stored energy electric generation systems, or BESS regulates the charge and discharge of a storage device, such as batteries, when electrically coupled to an electrical power distribution network. Larger energy consumers often sign power purchase agreements (PPA) to help the energy electrical companies plan on usage throughout the day. Typically these PPA require a certain amount of Mega-Watt hour (MWh) hour a month be discharged.

One method for controllers to regulate the charge and discharge of a storage device is to follow a preset schedule for discharging energy storage devices during a peak loads. The simple solution is to always follow a preset 24 hour schedule—charge when the prices are low, discharge during peak hours.

Another method for controllers to regulate the charge and discharge of a storage device is by frequency regulation. If the operating frequency an electrical power distribution network is below a threshold, the controller discharges the energy storage device to the electrical power distribution network.

SUMMARY OF THE INVENTION

A system and a method for regulating charging and discharging of an energy storage device as part of an electrical power distribution network is described. The invention is a smart control algorithm for a bi-directional switch in which an energy storage device, such as a battery set, is charged when electricity prices are low and discharged when electricity prices are high. The invention uses two different types of pricing data: forecasted price data and real-time price data. The forecasted price data is used to set a threshold. When the real-time price data of electricity exceeds this threshold, the energy storage device is set to discharge and send power to the grid. Otherwise the energy storage device is set to charge. The threshold is set periodically, typically in 30 minute to several hour intervals to capture the latest data.

More specifically described is a system and a method for regulating charging and discharging of an energy storage device as part of an electrical power distribution network. The method begins with calculating a moving average of the forecasted price data set by creating a series of averages of different subsets each covering a settable time window of the forecasted price data set over the settable time period in which each of the different subsets cover an overlapping period of time with a portion of the forecasted price data set that excludes a first unit of time of the settable time window in the different subsets and includes a next unit of time in the different subsets.

Next each average in the series of averages of the forecasted price data set for the settable time window is analyzed to identify a maximum forecasted price data subset of the forecasted price data set within the settable time period. A real-time price threshold based on a settable weighing factor applied to the maximum forecasted price data subset is determined.

Next real-time price data for electricity is accessed over a given unit of time in the geographic region served by the electrical power distribution network. In response to the real-time price data being higher than the real-time price threshold, switching a bi-directional inverter from a charge state to a discharge state, whereby in the discharge state, electrical power from the energy storage device is delivered to the electrical power distribution network. An example settable time period is 24 hours and settable time window is 5 hours. Other settable time periods and settable time windows are also contemplated.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
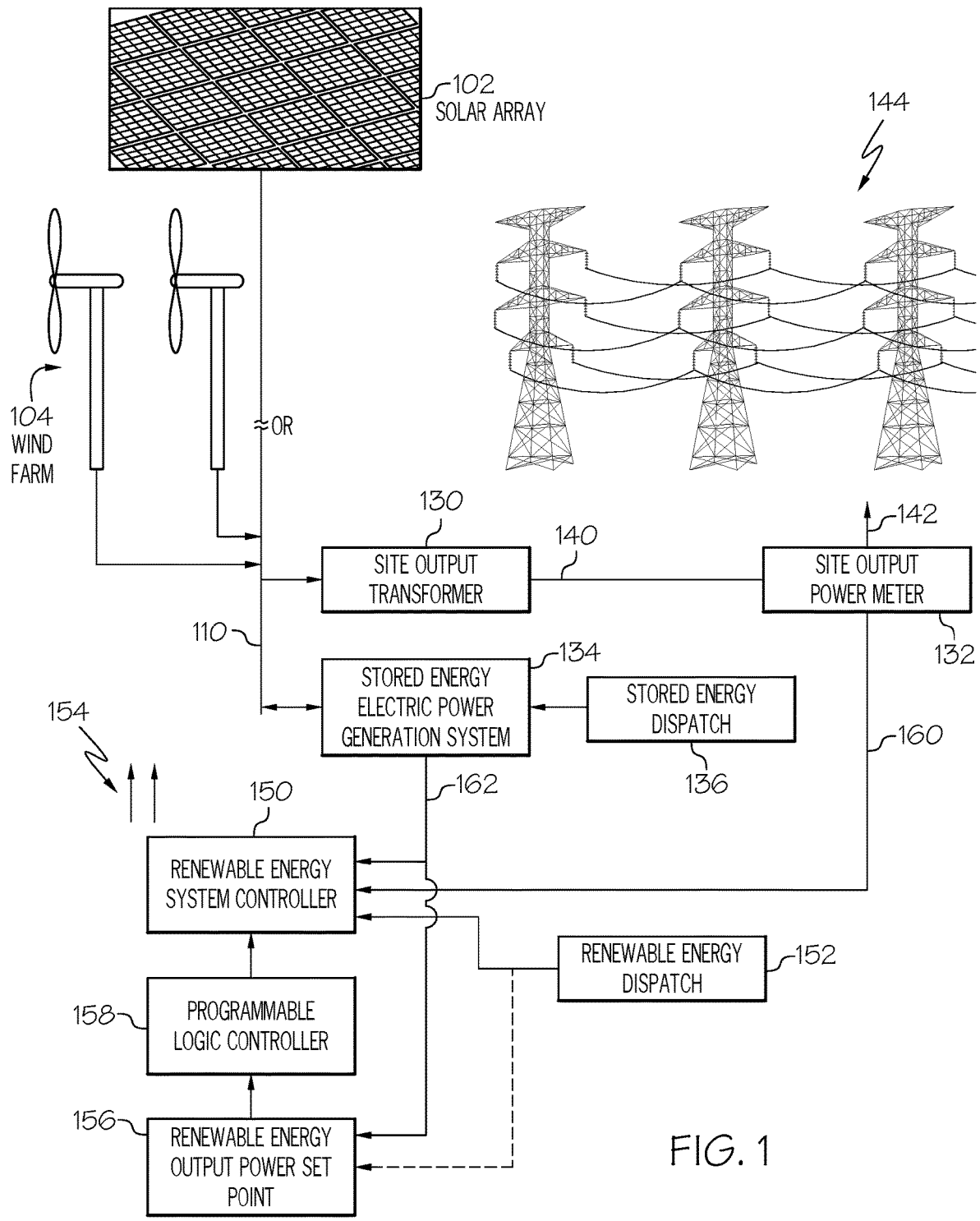
FIG. 1 illustrates a renewable energy electric generation site, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

Unlike the prior art controllers that just follow a preset schedule or look at the operating frequency of an electrical power distribution network, the present invention provides an algorithm to identify time periods for the possibility of extra revenue while still keeping to the power purchase agreements (PPA) for monthly MWH (Mega Watt Hours) discharged.

The invention is a smart control algorithm for a bi-directional switch in which an energy storage device, such as a battery set, is charged when electricity prices are low and discharged when electricity prices are high. The invention uses two different types of pricing data: forecasted price data and real-time price data. The forecasted price data is used to set a threshold. When the real-time price data of electricity exceeds this threshold, the energy storage device is set to discharge and send power to the grid. Otherwise the energy storage device is set to charge. The threshold is set periodically, typically in 30 minute to several hour intervals to capture the latest data.

Overview of a Renewable Energy Electric Generation Site

Integrating a stored energy electric generation system with a renewable energy electric generation system can be accomplished by connecting the power input/output connection of the stored energy electric generation system to the low voltage side of the output transformer that also connects the renewable energy electric generation system to the electric power transmission system. In one example, the power input/output connection of the stored energy electric power generation system is connected to the low voltage side of the output transformer for the renewable energy site.

Some examples of the below described systems and methods improve the operations of a renewable energy electric generation site that includes a stored energy electric generation system. These systems and methods improve the charging and discharging of energy storage device that is operating with a stored energy electric generation system.

The below described systems and methods allow for the efficient and cost effective incorporation of stored energy electric generation systems into variable output electric generation sites. The below described systems and method allow such efficient incorporations in a manner that provides improved method and system for regulating the charging and discharging of an energy storage device.

FIG. 1 illustrates a renewable energy electric generation site 100, according to an example. The renewable energy electric generation site 100 in this example produces electric power from a renewable source, such as solar photovoltaic and wind power, and delivers that electric power to an electric power transmission system 144. The depicted renewable energy electric generation site 100 is an example of a variable output electric power generation system that includes a solar array 102 which is composed of a number of solar panels and/or wind turbine electric generation farm 104 which is composed of a number of wind turbines.

The renewable energy electric generation site 100 also includes a stored energy electric power generation system 134. The stored energy power generation system 134 includes energy storage devices (not shown), such as batteries, and control circuit for charging the energy storage devices from the renewable energy sources and for discharging the energy storage devices to place power out the transmission towers 144. As described in further detail below, the stored energy electric power generation system 134 is responsive to signals from a stored energy dispatch function 136 and is electrically connected to a power output of the solar array 102 and/or the wind turbine electric generation farm 105 to provide electric power to an electric power output of the renewable energy electric generation site 100. The illustrated renewable energy electric generation site 100 is an example of an interconnected variable electric power generation system and stored energy electric generation system. As discussed above, the stored energy dispatch function 136 signals the stored energy electric power generation system 134 to generate an amount of electric power based on various criteria, such as, for example, meeting objectives or requirements of operating and regulating the quality of power on the grid, such as frequency regulation or other criterion known to those familiar with the art.

Overall operation of the solar array 102 and/or the wind turbine electric generation farm 104 is controlled by a renewal energy system controller 150. The renewal energy system controller 150 is responsive to signals from a renewal energy dispatch function 152 and is an example of a variable output electric power generation system controller that controls an electric power output of the variable output electric power generation system. The renewal energy system controller 150 in an example issues commands 154 to the solar array 102 and/or the wind turbines of the wind turbine electric generation farm 104. Typically, each wind turbine has its own controller (not shown) to control the operation of the individual wind turbines. As discussed above, the renewal energy dispatch function 152 signals the renewal energy system controller 150 to generate an amount of electric power based on various criteria, such as, for example, based on the frequency, voltage, or both, that are present on an electric power transmission system 144.

The renewal energy system controller 150 in an example operates to maintain a total electric power output of the renewable energy electric generation site 100 at a specified output power set point 156. The renewal energy output power set point 156 in various examples is set or provided by any suitable technique. In some examples, the site renewal energy output power set point 156 is provided by a higher-level control system or is provided by any suitable source. In an example, a renewal energy system controller 150 is able to be modified by adding a programmable logic controller 158. The programmable logic controller 158 is an example of an auxiliary controller that is added to the renewal energy system controller 150 to create a retrofitted variable output electric power generation system controller. The programmable logic controller 158 in an example provides an adjusted output power set point that is determined based on the present stored energy electric power input/output power flow level indicator 162 received from the stored energy electric power generation system 134. In some examples, the renewal energy output power set point 156 is able to be controlled or affected by a signal from the renewal energy dispatch function 152.

The electric outputs of the solar panels in the solar array 102 and/or the wind turbines at the wind turbine electric generation farm 102 are connected to a electric power output buss 110. In an example, these electric outputs from the renewable energy sources are connected to the electric power output buss 110 via various electric power interconnection elements (not shown) such as protection devices and other buss structures.

In the illustrated example, a stored energy electric power generation system 134 is also connected to the electric power output buss 110. As is understood by practitioners of ordinary skill in the relevant arts, the stored energy electric power generation system 134 is able to receive electric power from, or to provide electric power to, the electric power output buss 110. The stored energy electric power generation system 134 has a power input/output through which a present electric power flow is provided to the electric power output buss 110.

The operation of the stored energy electric power generation system 134 is able to be based on any suitable criteria, such as a configuration to consume electric power under specified conditions for storage within the stored energy electric power generation system 134. The configuration of the stored energy electric power generation system 134 is also able to cause the stored energy electric power generation system 134 to produce electric power under various conditions. In some examples, the present stored energy system electric power flow level through the input/output of the stored energy electric power generation system 134 is independent of direct control by the renewal energy system controller 150.

In the illustrated example, the stored energy electric power generation system 134 produces a present stored energy electric power input/output power flow level indicator 162 as an output signal. The present stored energy electric power input/output power flow level indicator 162 indicates present stored energy system electric power flow level through the input/output of the stored energy electric power generation system 134, which is the present amount of electric power consumed or produced by the stored energy electric power generation system 134. The renewal energy system controller 150 in an example has been adapted to receive the present stored energy electric power input/output power flow level indicator 162. As described in further detail below, the processing of the renewal energy system controller 150 to control the wind turbines in the wind turbine electric generation farm 102 in some examples is adapted to compensate for the amount of electric power being consumed or produced by the stored energy electric power generation system 134.

The electric power output buss 110 is also connected to a site output transformer 130. In general, the site output transformer 130 steps up the voltage present on the electric power output buss 110 to a higher voltage that is present on the electric power transmission system 144. In the illustrated example, the stored energy electric power generation system 134 and the wind turbine electric generation farm 102 both provide output electric power to the low voltage side of the site output transformer 130.

The site output transformer 130 produces electric power with a stepped up voltage at its high voltage output 140. The high voltage output 140 of the site output transformer 130 is connected in the illustrated example to a site output power meter 132. The site output power meter 132 conveys this high voltage electric power output to the electric power transmission system 144 through a transmission system connection 142.

The electric power delivered to the site output transformer 130 is the combination of the amount of electric power produced by the solar panels in the solar array 102 and/or wind turbine electric generation farm 104 and the electric power either produced or consumed by the stored energy electric power generation system 134. When the stored energy electric power generation system 134 is producing electric power, the total electric power delivered to the site output transformer 130, and thus to the electric power transmission system 144 through the site output power meter 132, is generally approximately the sum of the output electric power of the solar array 102 and/or the wind turbine electric generation farm 104 and the stored energy electric power generation system 134. When the stored energy electric power generation system 134 is consuming electric power, the total electric power delivered to the site output transformer 130, and thus to the electric power transmission system 144 through the site output power meter 132, is generally the output electric power of the solar array 102 and/or wind turbine electric generation farm 104 decreased by approximately the amount of power consumed by the stored energy electric power generation system 134.

The site output power meter 132 provides a present site output power indication 160 to the renewal energy system controller 150. The present site output power indication 160 is an example of an indicator of a total site electric power output. The renewal energy system controller 150 receives the present site output power indication 160 from the site output power meter 132 and controls the electric power output of the solar array 102 and/or wind turbine electric generation farm 104 to maintain a specified output power level to the electric power transmission system 144. As described below, the wind turbine site controller in an example is configured to also accept a present stored energy electric power input/output power flow level indicator 162 from the stored energy electric power generation system 134. The renewal energy system controller 150 in some examples controls the electric power output of the solar array 102 and/or wind turbine electric generation farm 104 based on both the present site output electric power level and the present stored energy system electric power flow level. In an example, the renewal energy system controller 150 is configured to remove the amount of power consumed or produced by the stored energy electric power generation system 134, as is conveyed in the stored energy electric power input/output power flow level indicator 162, from the determination of the output level to set for the wind turbine electric generation farm 102.

Overview of Regulating Charging and Discharging

Figure 2:
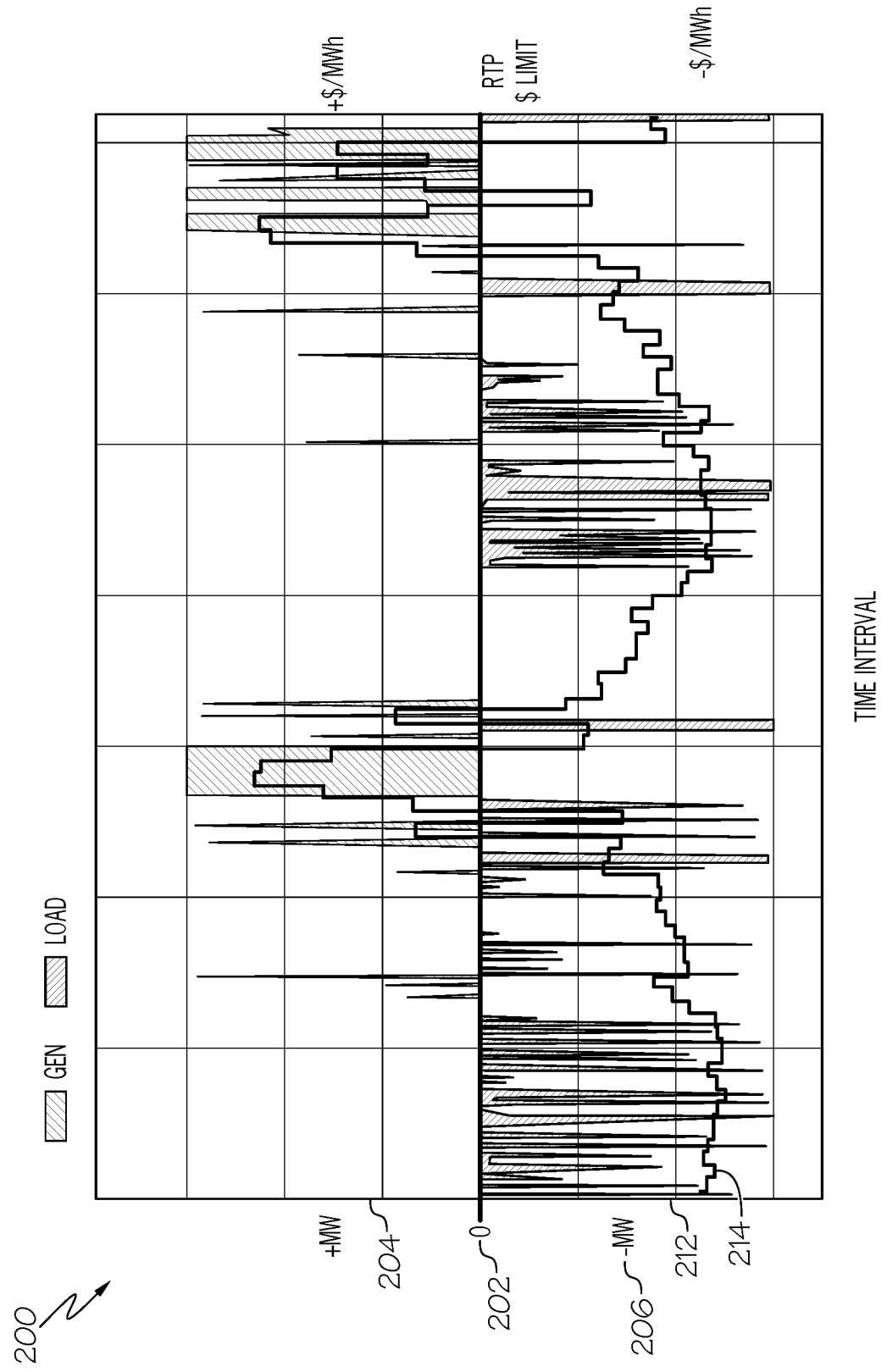
FIG. 2 is an example graph of the overall concept of using real-time and forecasted data to regulate charge and discharge of an energy storage device.

FIG. 2 is an example graph 200 of the overall concept of using real-time and forecasted data to regulate charge and discharge of an energy storage device, e.g. BESS or battery. The Y-axis represents power in Mega Watts (MW) and includes a zero crossing line 202. The X-axis represents time. The real-time price 214 is shown plotted with the zero crossing line 202. The signal 212 is a representation of the process flow in FIG. 3 in which both the forecasted price and the real-time price is used with set the threshold of when to charge/discharge the energy storage device. Below the zero crossing line 202 the energy storage device is charging. A moving average of the real-time price is used to capture any anomalies in the forecasted price. The region 204 above the zero crossing line 202 represents when power should be discharged or generated to the grid from the BESS. The region 206 below the zero crossing line 202 represents when power from the electric power output bus 110 should be used to charge the electric storage device.

In one example, the stored energy dispatch system 136 will run on a set, yet dynamic charge schedule. The novel algorithm will run simultaneously and will activate a discharge during the normal charge schedule when:

1. The real-time-price (RTP) is greater than an absolute price threshold, that is: RTP>$xx then discharge the energy storage devices until the RTP falls below the thresh-hold or the energy storage devices run out of charge. This captures any instantaneous price fluctuation.
2. The rate-of-change (RoC) of RTP for a moving average (e.g., a 30 times a minute moving average) is above a certain positive threshold and at a positive price point, that is, RoC of RTP>+$xx/min AND RTP>+$xx then discharge the energy storage devices until the RoC falls below the thresh-hold or the energy storage devices run out of charge. This will capture any positive pricing that falls below the absolute price threshold, in the event there are long periods of low, or even negative, prices. The purposed it to make sure any peak is not used just because it happened, rather the algorithm ensures that the RoC is high enough to take advantage of the peak for a period of time that allows the energy storage device to discharge to a set threshold.

Example Algorithm for Charging and Discharging

Figure 3:
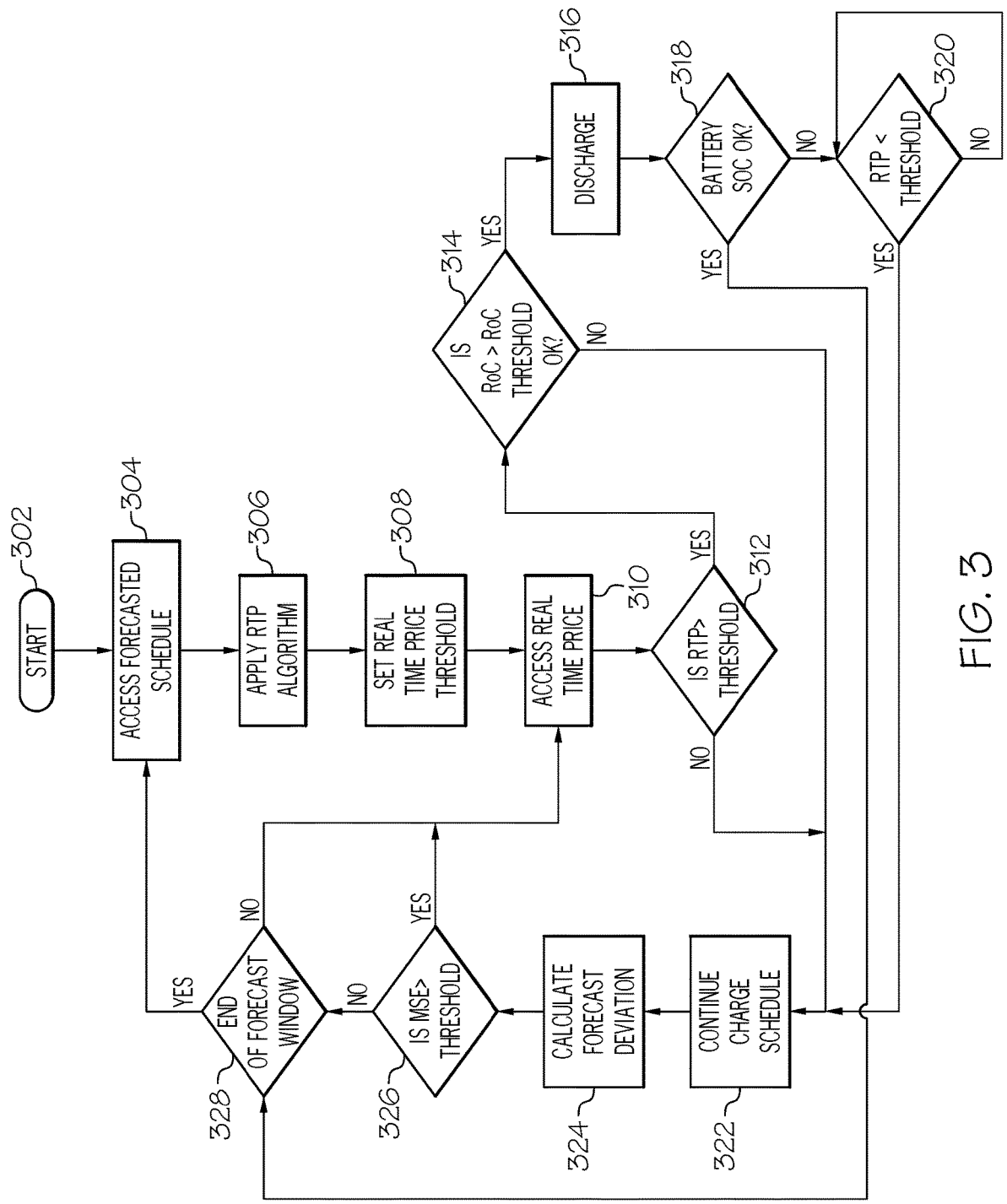
FIG. 3 is an example overview of the process flow for regulating charging and discharging of an energy storage device.

FIG. 3 is an example overview of the process flow for regulating charging and discharging 300. The present invention is unlike prior art system, that simply follows a daily 24 hour charge/discharge schedule. Simply following a 24 hour charge/discharge schedule would not take advantage of large swings in real-time pricing (RTP) spikes that occur, such as from IESO (Independent Electricity System Operator) of Ontario's power system) that could occur at any time of the day.

The present invention combines the current and forecasted real-time prices to provide power to the grid when prices are high because power is in demand.

Turning now to FIG. 3, the process starts with accessing the forecasted price data. The process begins in step 302 and immediately proceeds to step 304. The forecasted price data is available from a variety of sources including independent system operator (ISO) or regional transmission organization (RTO) as regulated by the Federal Energy Commission and third-party services such as from Enerdata, AleaSoft, Yes Energy management and others. Like any forecast sometimes the forecasted prices can be off the actual price. There can be a lot of deviation in the price during a given time period due to a change in demand that may not be captured by the forecasted price data. The process flows directly into step 306.

In step 306 a real-time pricing (RTP) algorithm is applied to the forecasted data. This RTP algorithm is further described in FIGS. 4A through 4E below. Next the process flows into step 308.

In step 308 a real-time price threshold is set. This is also further described in FIGS. 4A through 4E below. Next the process flows into step 310.

In step 310 the real-time price is accessed. The real-time pricing is available from a variety of governmental and third party sources, such as Enerdata, AleaSoft, Yes Energy management and others. Next the process flows into step 312.

In step 312 a test is made to determine if the real-time price (RTP) is higher than a threshold. This threshold is further described in FIGS. 4A through 4E below. In the event the RTP is higher than the threshold, the process continues to step 314. Otherwise, in the event the threshold is less than or equal to the threshold, the process continues to step 322 as further describe below.

In step 314, a test is made to determine of the Rate-of-Change (RoC) is above a RoC threshold. The RoC is described above. The process continues to step 316.

In step 316 the stored energy dispatch 136 switches on the stored energy electric power generation system 134 to generate power through the site output power meter 132 onto the transmission towers 142. The process continues to step 318.

In step 318 a test is made to determine if the state of charge (SOC) of the energy storage device, e.g. BESS, is above a SOC threshold. In the event the SOC of the stored energy device is equal to or below the SOC threshold, the process continues to step 320. Note that a low SOC will stop the discharge at anytime during the discharge period. The discharge period is defined as the fastest update rate of RTP, in our case every 5 minutes—e.g. the batteries will only discharge in 5 minute windows and goes back to check all the calculations, which happens almost instantaneously, so a drop in the discharge is not noticeable if all the conditions line up. After the discharge period and the SOC of the stored energy device is equal to or below the SOC threshold, the process continues to step 320.

In step 320, the process waits until the prices are below the threshold to start charging by looping back on itself as shown. Once the prices are below the threshold, the process continues to step returns to step 322.

In step 322 the energy storage element is switch to charge from the power being generated by the renewal energy sources on charge by the stored energy dispatch 136. In another example, the energy to charge the stored energy element may come from the grid or a combination of the grid and the renewable energy resources. The charging of the energy storage element is also controlled by a charge schedule (not show). The purpose of the charge schedule is to meet daily capacity commitments and power purchase agreements (PPA) allowing the energy storage element to charge. The process continues to step 324.

In step 324 a calculation is made to determine the deviation or mean square error (MSE) between the forecasted schedule and the actual schedule. This is calculation is further describe below with reference to FIG. 5. The process continues to step 324.

In step 326, a test is made to determine if the mean square error (MSE) is greater than a MSE threshold. In response to the MSE being above the MSE threshold, the process continues to step 310, otherwise the process continues to step 328.

In step 328 a test is made to see if the forecasted price is within the time window for the forecast. If the forecast is outside the window for the forecast the process continues to step 304 as part of an outer loop. Otherwise the forecasted data is still within the time window for the forecast and the process flow into step 310 as part of an inner loop.

Real-Time Prediction Threshold Algorithm

FIGS. 4A through 4E illustrates graphically determining a threshold and algorithm to determine the threshold. A moving window for a threshold is shown in FIG. 4A through FIG. 4E and the filter algorithm. The window size is five hours. Other window sizes can also be used. The Y-Axis is the price per megawatt hour ($/MWh) and the X-Axis is time. This example is based on a total 24 hour window but other size windows can also be used. This algorithm along with the process flow is running in the stored energy dispatch 136. The stored energy dispatch 136 in one example is a Programmable Logic Controller (PLC) or other computer. The stored energy dispatch 136 along with market RTP is used to discharge stored energy when the price is profitable from the stored energy electric power generation system 134 through site output transformer and site output power meter onto the transmission towers 142.

Figure 4A:
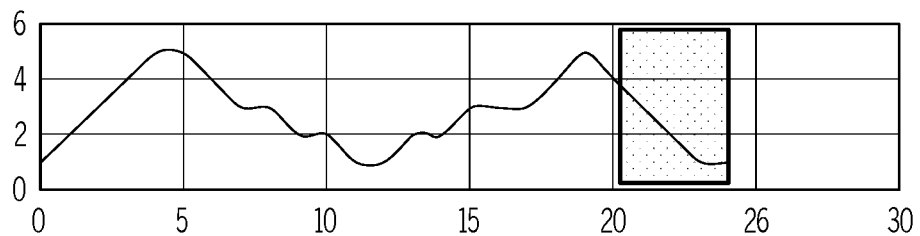
FIGS. 4A, 4B, 4C, 4D, and 4E illustrates graphically an algorithm to determine the real-time price threshold.

FIG. 4A illustrates a sum of the last five hours, starting at x=0 (HE24) and then ending in x=$x_{max}$ (HE0)

$$R_i = \sum_{x_{max}}^{x-5} f(x).$$

Figure 4B:
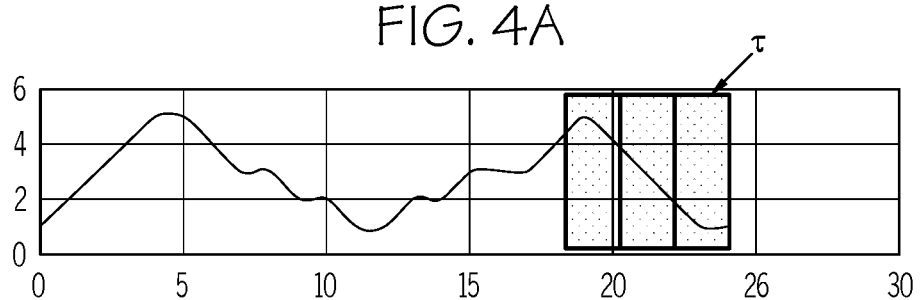

FIG. 4B illustrates the sum of the last five hours minus a given interval:

$$R_{i+\tau} = \sum_{x_{max}-\tau}^{x-5-\tau} f(x).$$

Figure 4C:
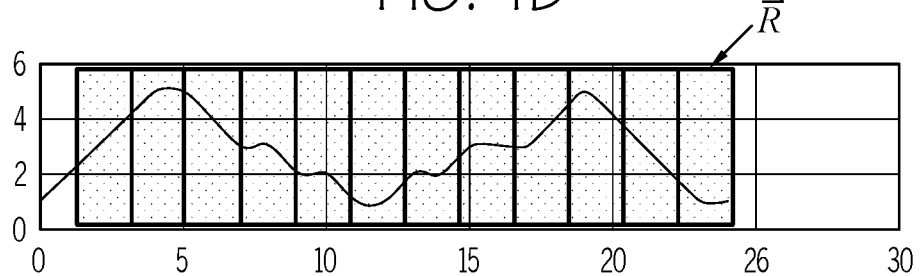

FIG. 4C illustrates collecting all five hour range sums in a vector:

$$\vec{R} = R_i R_{i+\tau} R_{i+2*\tau} \ldots R_{i+M*\tau} : M = 24/\tau.$$

Figure 4D:
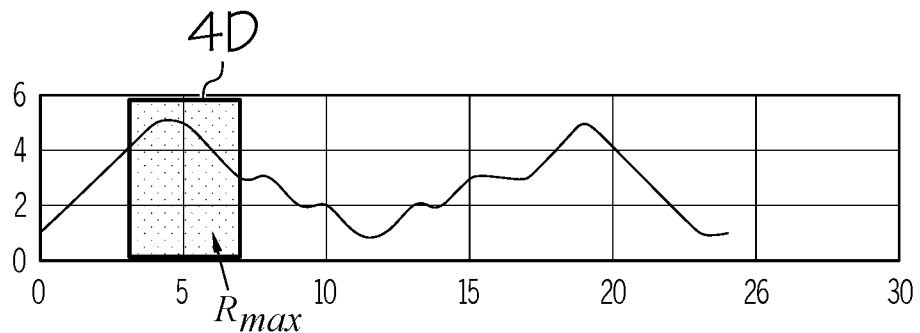
Figure 4E:
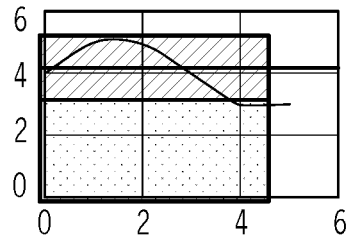

FIG. 4D illustrates $R_{max}$=argmax($\vec{R}$) and correlating the sected range to the time range in the forecast to get the average Threshold=½$\int_{x=0}^{5} R_{max}(x)$ This algorithm can be continuously enhanced and can be replicated at any peak-load shifting stored energy dispatch 136.

By combining current and forecasted real-time prices, the present invention provides power to the grid when power is in demand and power is scare.

Real-Time Forecast Deviation Algorithm

Figure 5:
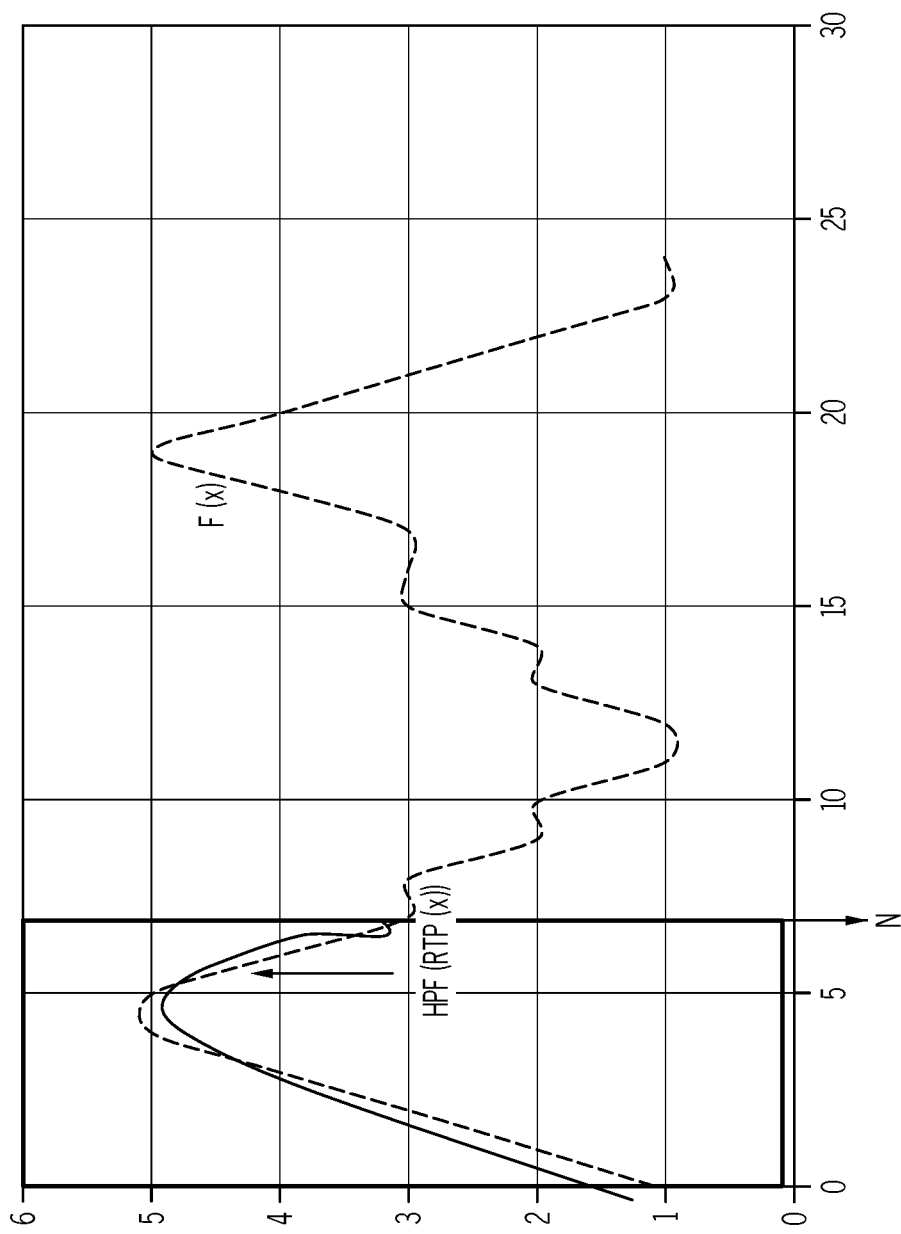
FIG. 5 is a graph of illustrating the real-time price deviation algorithm.

FIG. 5 is a graphical illustration how the real-time forecast deviation is calculated in FIG. 3. Shown is a graph in which the error from the forecast, F(x), and real time price value RTP(x) as it is captured through a high pass filter (HPF).

The mean squared error (MSE) is measured in in N collected samples where N is a sampling rate.

If the MSE is above a set MSE threshold then the forecast is abandoned and the novel algorithm kicks into play to capture changes in demand that are no longer tied to the original forecast.

In one example the MSE threshold begins by setting an arbitrary threshold based on the average historical peak pricing over a statistically significant amount of time. This MSE threshold is typically adjusted based on algorithm performance. Once the MSE threshold is triggered the algorithm recalcuates.

The charge schedule provided by the independent system operator (ISO) may or may not be accurate. The MSE threshold is based a degree of confidence or weight in the ISO RTP Schedule. The confidence or weight may be calculated using historical data by comparing the proposed scheduled with actual changes.

General Computer for Implementing Algorithm

Figure 6:
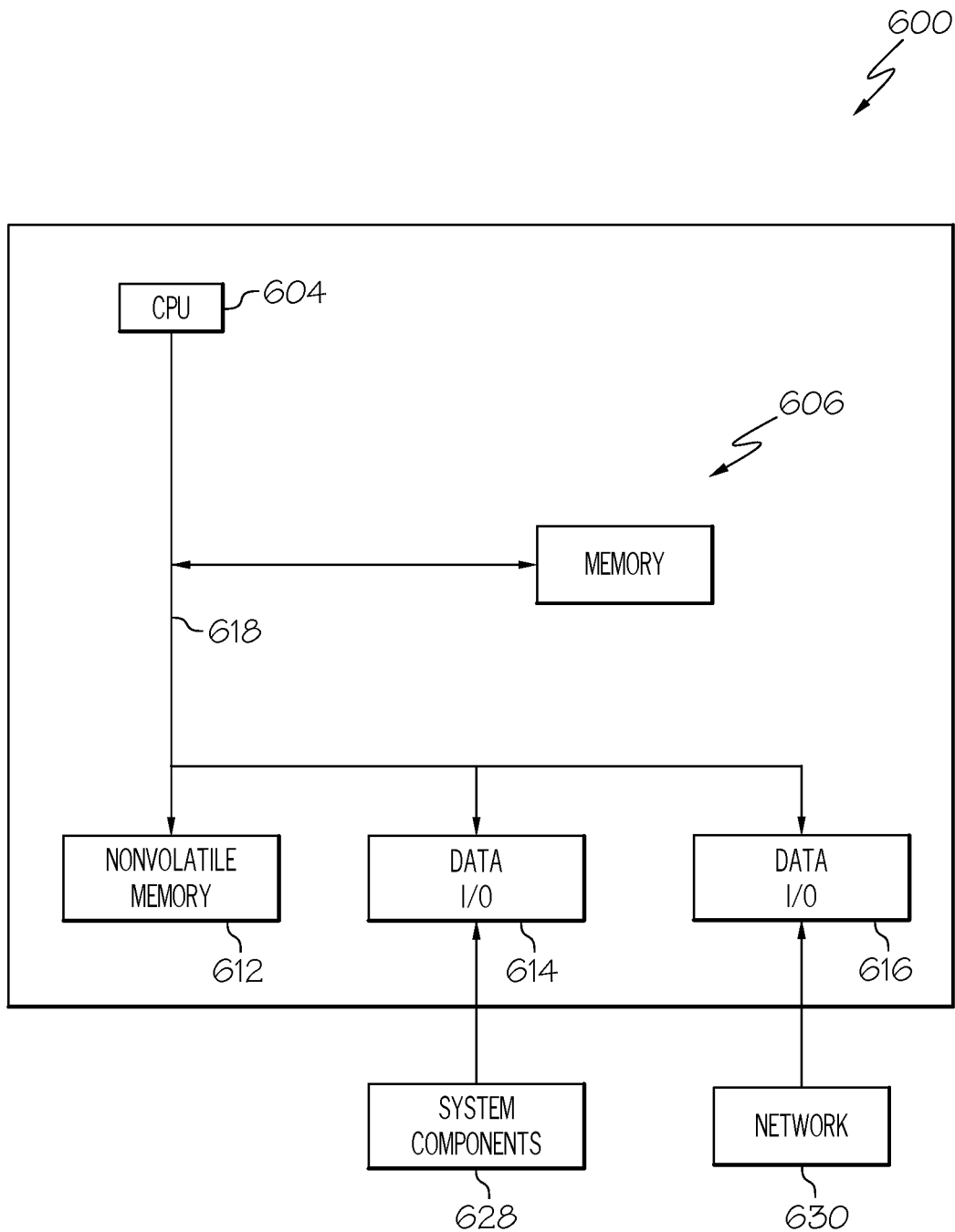
FIG. 6 illustrates a block diagram illustrating a processor, according to an example.

FIG. 6 illustrates a block diagram illustrating a processor 600 according to an example. The processor 600 is an example of a processing subsystem that is able to perform any of the above described processing operations, control operations, other operations, or combinations of these such as the stored energy dispatch 136, the renewable energy dispatch 152, and the programmable logic controller 158.

The processor 600 in this example includes a CPU 604 that is communicatively connected to a main memory 606 (e.g., volatile memory), a non-volatile memory 612 to support processing operations. The CPU is further communicatively coupled to a network adapter hardware 616 to support input and output communications with external computing systems such as through the illustrated network 630.

The processor 600 further includes a data input/output (I/O) processor 614 that is able to be adapted to communicate with any type of equipment, such as the illustrated system components 628. The data input/output (I/O) processor in various examples is able to be configured to support any type of data communications connections including present day analog and/or digital techniques or via a future communications mechanism. A system bus 618 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A system for regulating charging and discharging of an energy storage device as part of an electrical power distribution network, the system comprising:
    a computer memory capable of storing machine instructions; and
   a hardware processor in communication with the computer memory, the hardware processor configured to access the computer memory, the hardware processor performing
    a) accessing a forecasted price data set of electricity over a given unit of time and over a settable time period in a geographic region served by the electrical power distribution network;
    b) calculating a moving average of the forecasted price data set by creating a series of averages of different subsets each covering a settable time window of the forecasted price data set over the settable time period in which each of the different subsets cover an overlapping period of time with a portion of the forecasted price data set that excludes a first unit of time of the settable time window in the different subsets and includes a next unit of time in the different subsets;
    c) analyzing each average in the series of averages of the forecasted price data set for the settable time window to identify a maximum forecasted price data subset of the forecasted price data set within the settable time period;
    d) determining a real-time price threshold based on a settable weighting factor applied to the maximum forecasted price data subset;
    e) accessing real-time price data for electricity over a given unit of time in the geographic region served by the electrical power distribution network and determining a state of charge of the energy storage device; and
    f) in response to both the state of charge of the energy storage device being higher than a state of charge threshold and the real-time price data being higher than a real-time price threshold, switching a bi-directional inverter from a charge state to a discharge state, wherein the discharge state, electrical power from the energy storage device is delivered to the electrical power distribution network, and a total electric power distribution delivered to the power distribution network is a sum of electrical power from the energy storage device and electrical power generated from a solar array and/or wind turbine electric generation farm, and otherwise, the bi-directional inverter remains in the charge state.

2. The system of claim 1, wherein the given unit of time is hours and the settable time period is 24 hours.

3. The system of claim 1, wherein the calculating the moving average ($R_{i+\tau}$) of the forecasted price data set is given by $$R_{i+\tau} = \sum_{x_{max}-\tau}^{x-5-\tau} f(x)$$

in which x is time, $x_{max}$ is the settable period of time, $\tau$ is some time interval, f(x) is the forecasted price data set.

4. The system of claim 3, wherein the analyzing each average in the series of averages ($\vec{R}$) is given by $$\vec{R} = R_i, R_{i+v}, R_{i+2*\tau} \ldots R_{i+M*\tau} : M = 24/\tau$$

and $$R_{max} = \mathrm{argmax}(\vec{R}).$$

5. The system of claim 4, wherein the real-time price threshold is given by Threshold=½$\int_{x=0}^{5} R_{max}(x)$.

6. The system of claim 1, wherein step f further comprises
    f) in response to each of i) the state of charge of the energy storage device being higher than a state of charge threshold, ii) and the real-time price data being higher than a real-time price threshold, and iii) rate of charge being higher than a rate of charge threshold, switching a bi-directional inverter from a charge state to a discharge state, wherein the discharge state, electrical power from the energy storage device is delivered to the electrical power distribution network.

* * * * *